May 2, 1950        E. W. SHAW        2,506,178
AIRCRAFT AUXILIARY LANDING GEAR

Filed March 7, 1946        5 Sheets-Sheet 1

INVENTOR.
Edward W. Shaw
BY Charles S. Wilson
ATTORNEY.

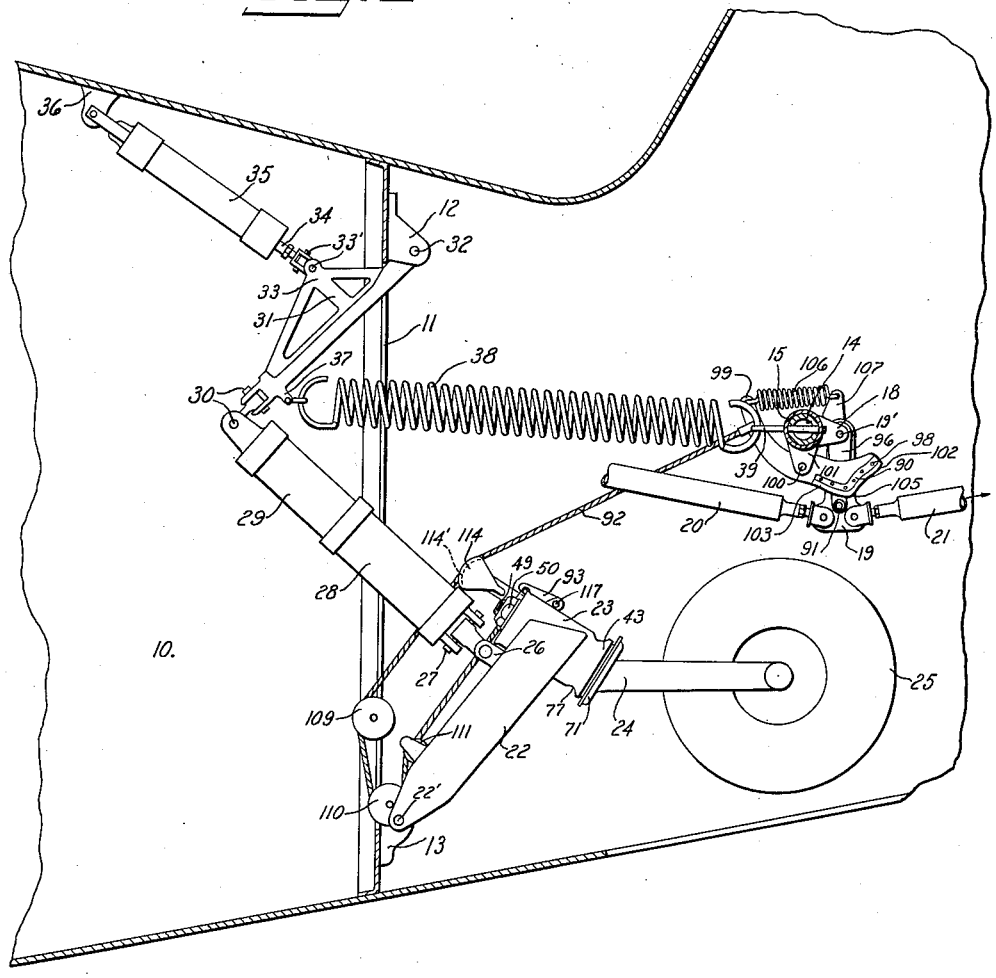

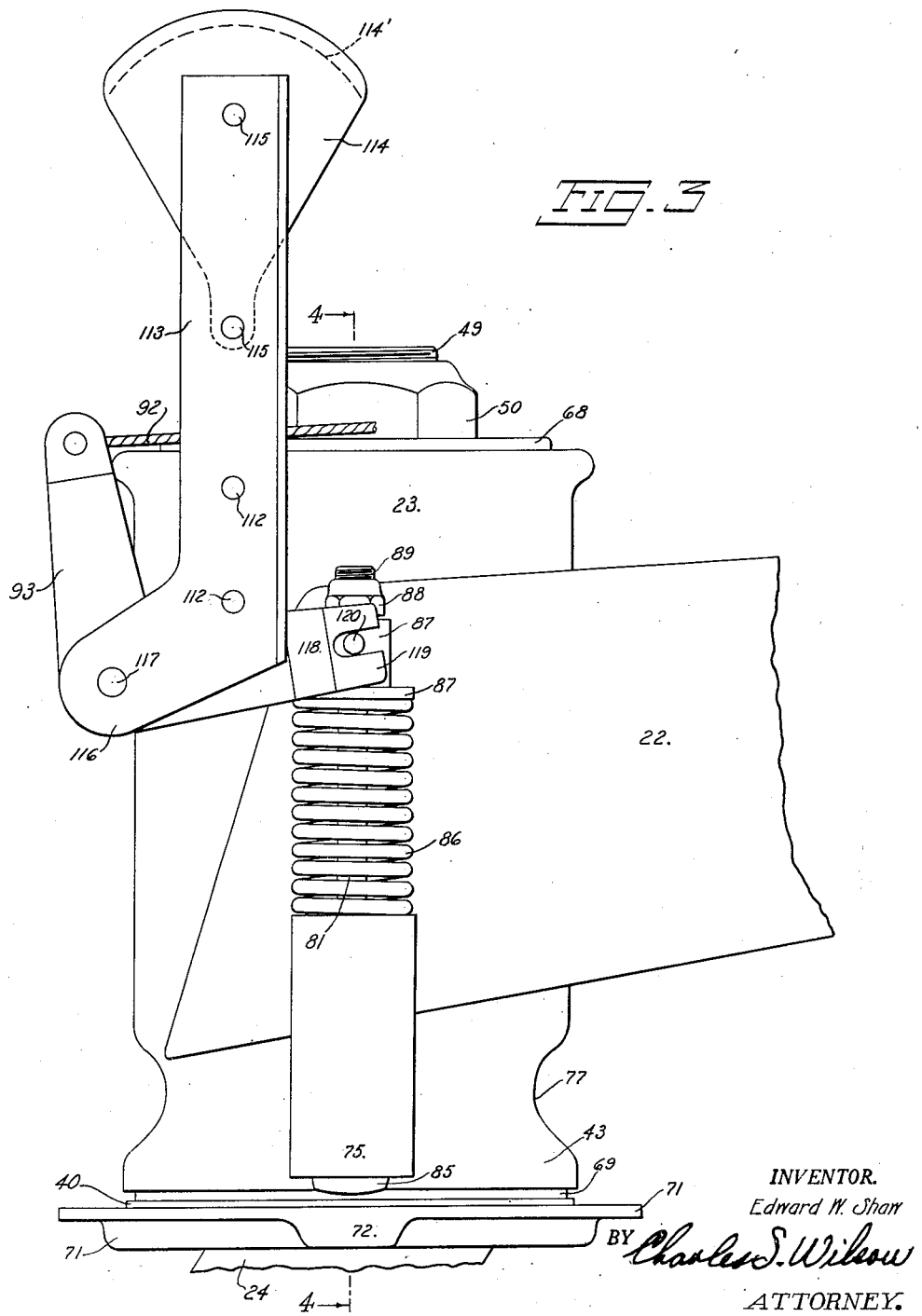

May 2, 1950  E. W. SHAW  2,506,178
AIRCRAFT AUXILIARY LANDING GEAR
Filed March 7, 1946  5 Sheets-Sheet 4
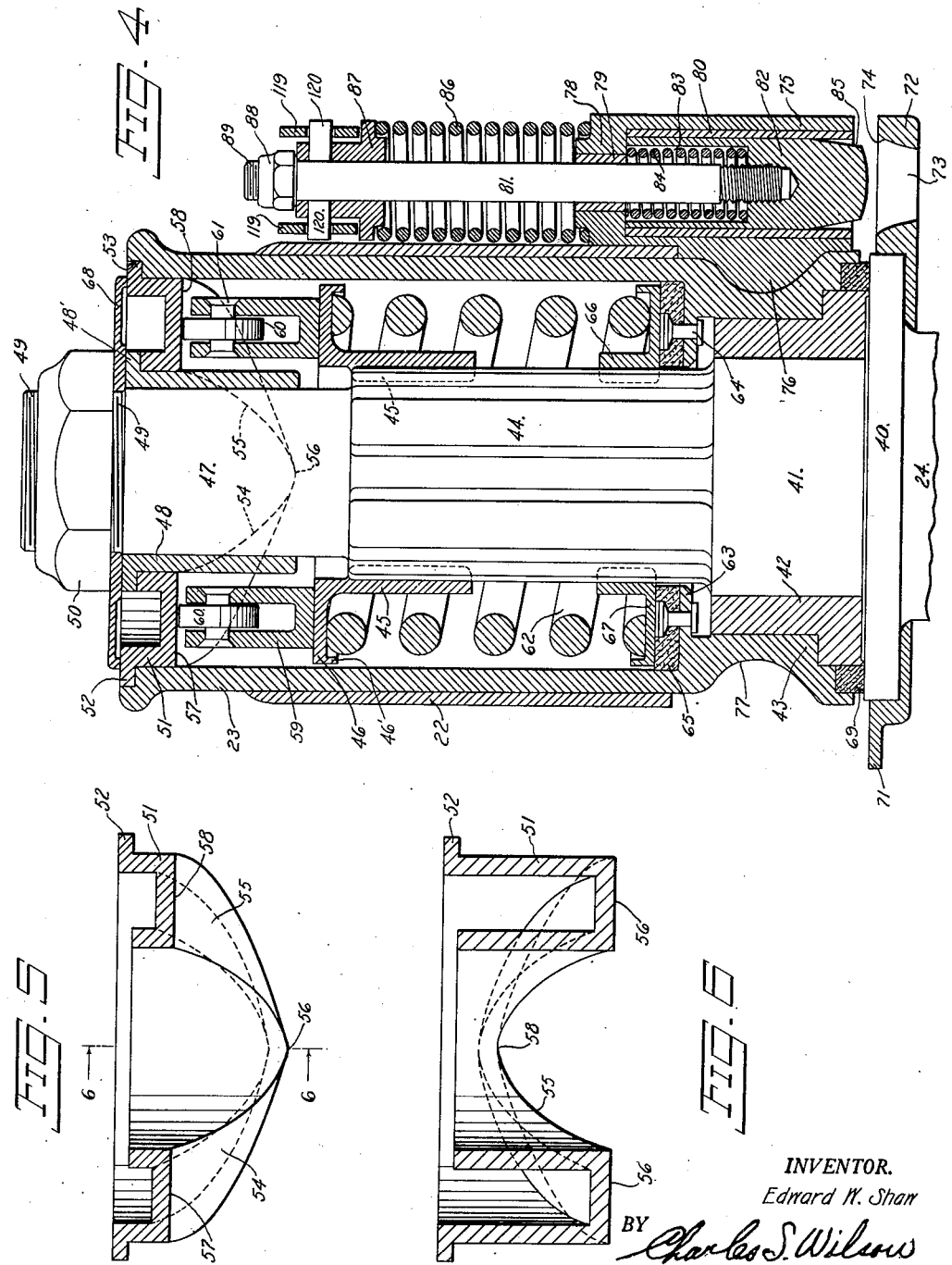
INVENTOR.
Edward W. Shaw
BY Charles S. Wilson
ATTORNEY

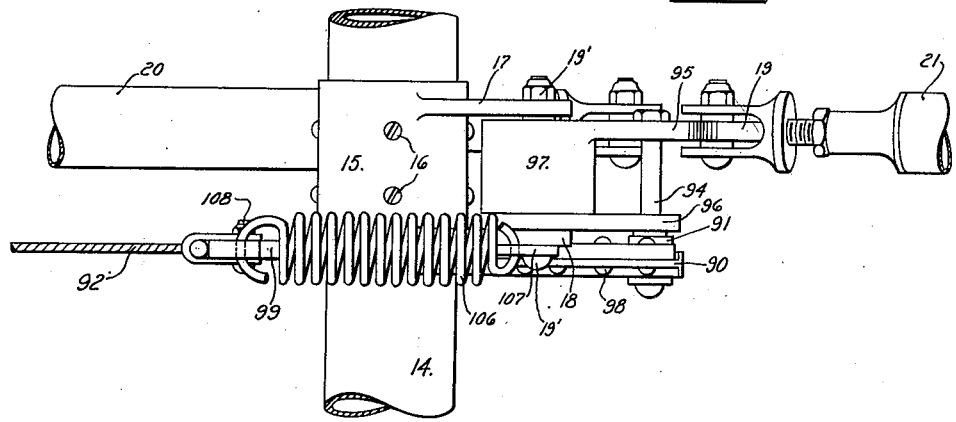
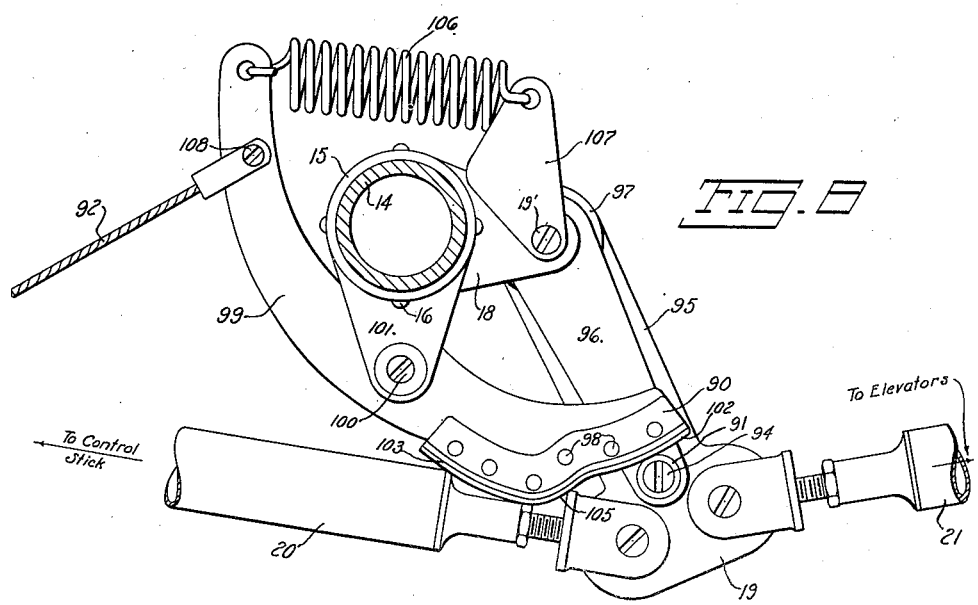

Patented May 2, 1950

2,506,178

UNITED STATES PATENT OFFICE 2,506,178

AIRCRAFT AUXILIARY LANDING GEAR

Edward W. Shaw, Babylon, N. Y., assignor to Republic Aviation Corporation, Farmingdale, N. Y., a corporation of Delaware Application March 7, 1946, Serial No. 652,603

20 Claims. (Cl. 244—50)

The invention relates to aircraft auxiliary landing gears, such as tail wheels, nose wheels, or tail skids, of the castering or swivelling type and proposes new and improved means to center and lock such gears in fore-and-aft alignment when swivelling or castering becomes objectionable or dangerous, as, for example, during certain phases of take-off and landing.

Although both manually and automatically controlled locking mechanisms have been previously proposed, they have not proven entirely satisfactory in actual practice. The main objection to manually controlled locking mechanisms for auxiliary landing gears is that they require an additional control lever or member in an already crowded cockpit, as well as additional cables, fittings and other connections between the landing gear and control member or lever in the cockpit and also require the attention of the pilot during take-off or landing, i. e. when he is most occupied in the actual control of the plane. Automatic locking mechanisms, unless provided with a manual emergency release, have been found objectionable because they determine too rigidly the periods when the gear is locked or is free to swivel and thus render taxiing hazardous under conditions where more flexibility is required or desired.

The present invention is predicated on the known coincidence in the operation of the elevators and the locking of the auxiliary landing gear against swivelling, or of freeing it for castering. In landing or during take-off it is desirable that the auxiliary landing gear (skid or nose or tail wheel) be locked against castering or swivelling in order to insure safe operation and to prevent yawing or ground loops: and in landing and during take-off certain conventional adjustments of the elevators are required. Therefore, it is proposed by the present invention to so coordinate the standard or conventional elevator control mechanism of an aircraft with the mechanism for locking the auxiliary landing gear against castering or swivelling that concurrently with the required conventional adjustments of the elevators for or during landing or takeoff the auxiliary landing gear is locked. Thus the objectionable rigidity of the prior automatic locking mechanisms is avoided and the additional control member, cable connections and associated parts, customarily used in manually controlling the mechanism locking the auxiliary landing gear against swivelling, are eliminated. In this manner the present invention relieves the pilot of the burden of controlling the locking mechanism for the auxiliary gear at a time when he is especially occupied with the other manipulations and precautions involved in and coincident with take-off or landing.

With the above and other objects in view, as will be apparent, the invention consists in the construction, combination and arrangement of parts, all as hereinafter more fully described, claimed and illustrated in the accompanying drawings, wherein:

Fig. 2 is a similar view showing the tail wheel assembly of Fig. 1 in its retracted position:

Fig. 3 is an enlarged side elevation of a part of the housing and mounting for the spindle of the tail wheel and associated external elements as viewed from the side opposite of these parts to that shown in Figs. 1 and 2:

Fig. 4 is a vertical section taken along line 4—4 of Fig. 3 to illustrate the details of the tail-wheel spindle and the lock by which it is fixed or secured against swivelling or castering:

Fig. 5 is a vertical section of the cam plate shown in its operative position in Fig. 4 wherein the cams appear in elevation:

Fig. 6 is a vertical section taken along line 6—6 of Fig. 5:

Fig. 7 is a plan view of the interconnected components of the locking mechanism and of the elevator control mechanism whereby the operation of these mechanisms is coordinated: and Fig. 8 is a side elevation of the interconnected components of the locking mechanism and of the elevator control mechanism as shown in Fig. 7.

Figure 1:
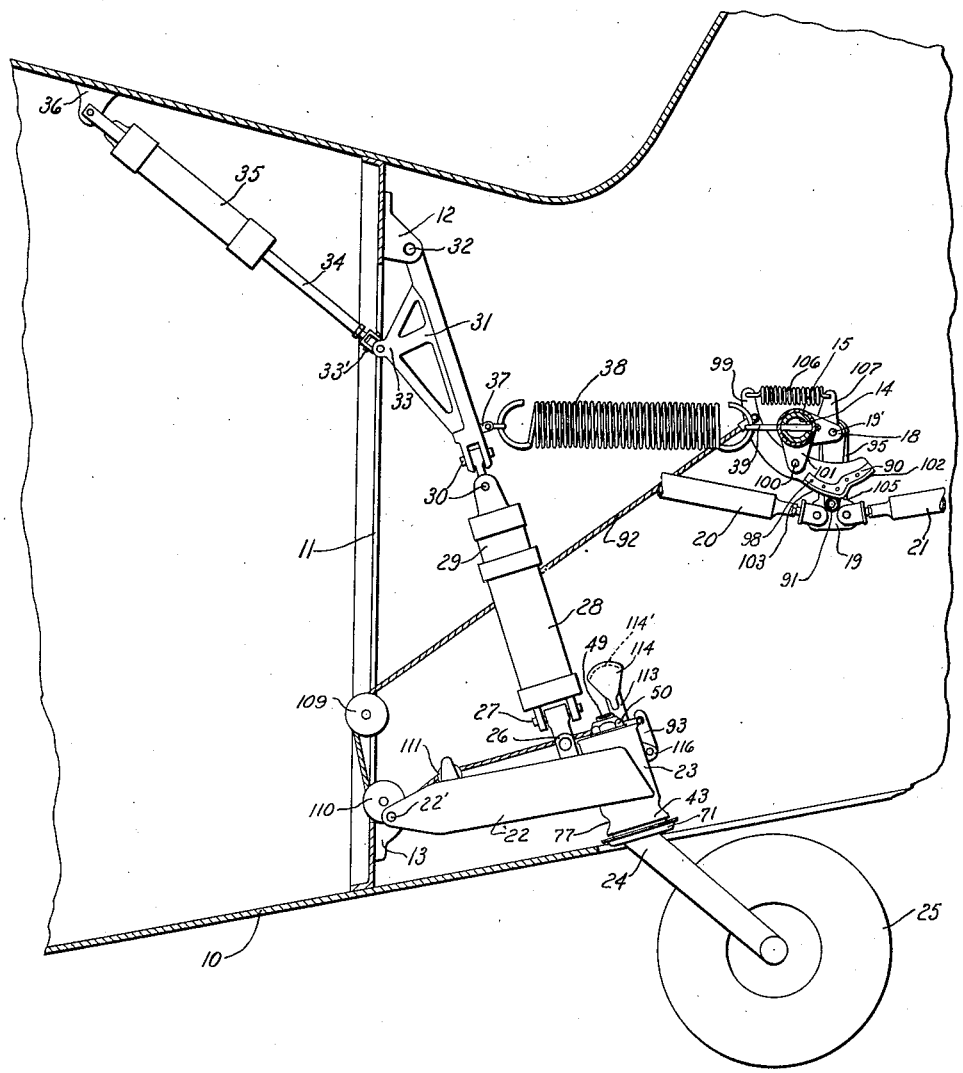
Fig. 1 is a side elevation of a retractable tail wheel assembly embodying the present invention, illustrating the wheel protracted and the associated aircraft parts in section.

Referring to the drawings, the present invention is illustrated as embodied in an aircraft having a fuselage 10 (part of the tail structure of which is shown in section). This tail structure 10 includes a rear bulkhead 11, carrying an upper bracket 12 and a pair of horizontally aligned lower brackets 13 disposed below and within the same vertical plane as the upper bracket 12, and a tubular support 14 mounted horizontally across the fuselage 10 aft of and substantially parallel to the bulkhead 11. On this support 14 is medially fastened a sleeve 15 by means of screws or rivets 16 (Figs. 7 and 8). This sleeve 15 carries two parallel arms 17 and 18 spaced one from the other longitudinally of the sleeve and projecting radially and rearwardly from the sleeve in a generally horizontal plane. Between and adjacent the ends of the arms 17 and 18 extends a transverse bolt 19' upon which is pivotally suspended (as will be hereinafter described) the idler link 19 by which the link 21 leading to the elevators is connected to the link 20 leading to the control stick or lever in the cockpit. Since the links 19, 20 and 21 are the only elements of the elevator control system or linkage that are necessary to an understanding of the present invention the remainder of the control system or linkage is not illustrated.

On the pair of horizontally aligned lower brackets 13 is pivotally mounted, as at 22', a tail wheel support and retracting assembly comprising a V-shaped yoke 22, a tubular spindle housing 23, welded to the apex of the V and a spindle normally free to swivel within said housing and provided with an offset lower knuckle 24 adapted to receive and mount a tail wheel 25.

To the apex of the V-yoke is welded or otherwise secured an upwardly extending lug 26, the outer extremity of which is pivotally connected through a universal joint 27 to the cylinder 28 of an oleo shock absorber. The telescopic plunger 29 of the shock absorber is pivotally connected, by means of a universal joint 30, to one corner of a generally triangular strut 31. This strut 31 has another corner 32 pivoted to the upper bracket 12 while the remaining corner 33 is pivoted by means of a universal joint 33' to the piston 34 of a hydraulic retracting motor 35, hinged to a fixed part of the fuselage 10 by any suitable means, such as the bracket 36. Adjoining its connection to the plunger 29 of the shock absorber the strut 31 carries a hook 37 to which is anchored the fore end of a coil spring 38, the rear end of which is anchored to an eyebolt 39 piercing and secured to the tubular support 14. When the tail wheel 25 is in its protracted position (Fig. 1), the oleo shock absorber 28—29 and the long side of the triangular strut 31 are aligned and form the links of a toggle mechanism which is kept on dead center by the coil spring 38 assisted by the retracting motor 35, then hydraulically locked in the extreme extended position of its piston 34. The retraction of piston 34 within the cylinder of the hydraulic motor 35 to the position shown in Fig. 2 breaks this toggle against the action of the spring 38 and swings the yoke 22 counterclockwise about its pivots 22' thereby retracting the wheel 25 into the fuselage 10 (Fig. 2).

The tail wheel spindle (Fig. 4) comprises a collar 40, a lower journal 41 formed above said collar to cooperate with a lower bearing 42 secured in the bottom 43 of the housing 23, a spline 44 on which is slidably mounted, an internally splined sleeve 45 having an annular flange 46, an upper journal 47 positioned above the spline 44 to cooperate with an upper bearing 48 and a threaded end portion 49 on which is screwed an assembling nut 50. The upper part of the post or housing 23 is closed by a circular cover or cam plate 51 extending into the housing 23 and having an outstanding flange 52 seated in a recess or groove 53 formed in the inner wall of the housing 23 adjacent its upper end. The bottom or inner surface of this cover or plate 51 is in the form of a continuous cam surface or track composed of two oppositely disposed semi-circular double ramps 54 and 55 combining to form a cam lobe and having their adjoining lowermost bottom-ends 56 aligned radially along a lower diameter of the plate 51 and their respective apices 57 and 58 aligned along an upper diameter of the plate 51 perpendicular with respect to said lower diameter. As a bearing for the journal 47 adjacent the outer extremity of the spindle, a bushing or collar 48 is pressed into a central concentric opening in the cover or cam plate 51 and at its end is provided with an outstanding flange 48'. When the bushing or collar 48 is in its operative position it is rigidly assembled with and surrounded by the cover or cam plate 51 and its flange 48' rests coplanar and coextensive with the flange 52 and on that edge of the plate 51 defining the central concentric opening through which the bushing or collar 48 passes.

Surrounding the spline 44 of the spindle is a sleeve 45, internally splined for reciprocating co-operation with spline 44 and provided with a flange 46 at the end thereof toward the bushing or bearing 48. At its edge and within the housing 23 the flange 46 is provided with a lip 46' lying parallel to and spaced from the sleeve 45. On the face of flange 46 of the sleeve 45 opposed to the lip 46' are rigidly mounted a pair of diametrically opposed U-brackets 59 each supporting a roller 60 rotatably mounted on a rivet 61 secured through the arms of the coacting bracket. These two rollers 60 are constantly urged upwardly against the ramps 54 and 55 of the cam plate 51 by means of a coil spring 62 encircling the spline 44 as well as the sleeve 45 and bearing against the underside of the flange 46 of said sleeve within the lip 46'. The cam ramps 54 and 55, the rollers 60 and the spring 62 constitute a self-centering device for the tail wheel 25 and its spindle 41—44—47, which is completely enclosed within the housing 23.

Near the bottom or lower end 43 of the housing 23 is an inwardly extending shoulder or shelf 63, on which is secured, by the countersunk rivets 64, a fixed friction ring 65. The spline 44 slidably carries near its lower end an internally splined sleeve 66 having an annular flange 67 on which bears the lower extremity of the spring 62. The lower flat face of this flange 67 acts as a pressure ring in cooperation with the friction ring 65 to dampen progressively the swivelling motions of the wheel 25 out of its neutral or fore-and-aft aligned position in either direction. In the neutral position of the self-centering device shown in Fig. 4, which corresponds to the fore-and-aft aligned position of the wheel 25, there is sufficient energy in the spring 62 to maintain the rollers 60 tightly pressed against the apices 57 and 58 of the cams or ramps 54 and 55 and to press the ring 67 strongly upon the friction ring 65, thus damping any tendency of the wheel 25 to flutter or shimmy at the inception of said undesirable oscillations.

The interior of the housing 23 is protected at its top against entry of foreign material by means of a dust cover 68 held between the nut 50 and the flange 52 of the cam plate 51 and the flange 48' of the upper bearing 48. At its bottom a packing ring 69 surrounds the lower bearing 42 and is compressed between the bottom 43 of the housing 23 and the collar 40 of the knuckle 24 when the device is assembled with the nut 50 in its operative position. Thus the lower end of the housing 23 is protected from the entrance of foreign matter.

To the periphery of the collar 40 is fastened or attached an annular flanged ring 71 having a circular bolt hole 73 tapered or flared at its entrance 74 and surrounded by a boss 72 on the underside of the ring 71. As will be described more in detail it is by means of this ring 71 fixed to the collar 40 and by it to the spindle 41—44—47 that the tail wheel 25 and its associated parts may be locked against castering or swivelling.

A tubular bolt casing 75 having an external and integral lateral boss 76 to be engaged in a peripheral groove 77 in the wall of the housing 23 at or near its bottom 43, is welded or otherwise fixedly secured to one side of the housing 23 with its axis parallel to the axis of the spindle 41—44—47 and in vertical alignment with the bolt hole 73 when the wheel 25 is situated in substantially true fore-and-aft position, i. e. when the parts associated with the spindle are relatively situated as shown in Fig. 4.

The hollow bolt casing 75 is partly closed at the end thereof remote from the ring 71 and its flared bolt hole 73 by the centrally and concentrically apertured end wall 78. Within the aperture of the end wall 78 is a liner or bushing 79 and a similar liner or bushing 80 is positioned within the bore of the casing 75 to extend from the inner face of the end wall 78 to the lower extremity of the casing. A bolt 82 having a slightly tapered end portion 85 is mounted for reciprocation in the casing 75 so that when the bore of the casing 75 and the bolt hole 73 are aligned the end 85 of the former may be projected into the latter. The inner end of the bolt 82 defines a concentric passage 83 at the bottom of which is a threaded socket. A bolt stem extends through the opening in the end wall 78 of the casing and through the passage 83 in the bolt to be threaded into the socket in the bottom of said passage thereby to attach the stem to the bolt all as illustrated in Fig. 4. Between the inner face of the end wall 78 and the bottom of the passage 83 a compression spring 84 is housed in said passage 83 and encircles the stem 81. This spring urges the bolt 82 and its stem 81 downwardly in the casing 75. The tapered end portion 85 of the bolt 82 when abandoned to the action of the spring 84 is projected into hole 73 of the ring 71 to lock the wheel 25 in exact fore-and-aft alignment and due to the flared entrance 74 of the opening 73 this projection of the end 85 of the bolt exactly centers the wheel even if it is slightly out of alignment at the beginning of the movement of the bolt.

Normally the tail wheel 25 is free to swivel or caster, as the bolt 82 is kept in its retracted or non-projected position within the casing 75 by a coil spring 86 capable of overcoming the action of the locking or projecting spring 84. This spring 86 surrounds the portion of the stem 81 extending beyond the end wall 78 and operates between the outer face of said end wall and a sleeve 87 slidably mounted on the stem 81 of the locking bolt 82. Hence this sleeve 87 is urged by the spring 86 to the outer end of the stem 81 where it abuts a nut 88 adjustably threaded on the extremity 89 of the stem 81 and thereby retracts the bolt 82 inwardly of the casing 75 against the action of the spring 84 until the inner end thereof contacts the underface of the end wall 78. The elements are shown in this retracted position of the bolt 82 in Fig. 4.

To operate the bolt 82, against the action of this retracting spring 86, when it is desired to lock the wheel 25 in fore-and-aft alignment, use is made of the push-pull rod system or linkage controlling the movements of the elevators from the cockpit of the aircraft, only the links 20 and 21 and the last idler 19 of which are shown in Figs. 1, 2, 7, and 8.

To that end the idler 19 is provided with an integral radial arm 95 located centrally between its ends and which is fixedly attached to one end of a hub 97. This hub 97 pivotally embraces the bolt 19' secured to and extending between the arms 17 and 18 of the sleeve 15 and hence pivotally suspends the idler 19 on the bolt 19'. A second radial arm 96 is fixedly secured to the opposite end of the hub 97 to rest parallel to and spaced from the arm 95. The outer ends of those arms 95 and 96 are traversed by a bolt 94 which protrudes beyond the outer face of the arm 96 and there pivotally supports a roller or cam follower 91. Rigidly secured to the stationary sleeve 15 adjoining the arm 18 is a vertical bracket plate 101 and adjacent to the extremity thereof is supported a lever 99 pivoted medially of its ends, as at 100, to said bracket plate. A cam 90 is riveted or otherwise secured, as at 98, to one face and at one end of the lever 99 and comprises two curved tracks 102 and 103 (Fig. 8) the first of which is concentric to the pivot bolt 19' in the angular position of the lever 99 shown in Fig. 8 and the second of which is concentric to the pivot bolt 19' in the angular position of the lever 99 shown in Fig. 1. These two tracks 102 and 103 are joined by a ramp 105 thereby combining to constitute a continuous cam projecting below the lower edge of the lever 99.

A coil spring 106, attached at one end to an anchor plate 107 secured to the fixed arm 18, and at its other end to the end of the lever 99 on the opposite side of the pivot 100 to the cam 90, tends constantly to swing the lever 99 clockwise about said pivot 100 to maintain the cam 90 in operative engagement with the roller or cam-follower 91.

That end of the lever 99 remote from the cam 90 has one end of a cable 92 secured thereto by any suitable means, as for example the clevis 108. This cable 92 is reeved over the pulleys 109 and 110 mounted on the bulkhead 11 and over the pulley 111 mounted on the yoke to terminate in proximity to the outer end of the bolt stem 81. The function and purpose of the cable 92 will be hereinafter set forth in detail. The relative positions of the pulleys 109, 110 and 111 with respect to the pivot 22' of the yoke 22 is such that the normal tension of the cable is not substantially affected by the angular or swinging movement of the yoke 22 about the pivot 22' when the wheel 25 is being either retracted or protracted.

On that side of the housing 23 adjoining the casing 75 is fixedly secured an upright 113 by means of rivets 112 which carries at its upper end a grooved baffle or deflector 114 fastened thereto by means of the rivets 115. This deflector 114 is so associated with housing 23 and with the cable 92 that it lies at all times in the vertical plane of the cable 92 so that when the wheel 25 is retracted, as shown in Fig. 2, the cable will seat in the groove 114' in the edge of the deflector. The upright 113 has a lateral extension 116 at its lower end to project beyond the housing 23 where it pivotally supports a bell-crank lever 93 on a pin 117 traversing said extension 116 and the elbow of the bell-crank 93.

One arm of the bell-crank 93 normally occupies a generally horizontal position and terminates in a fork 118 one branch of which lies on each side of the sleeve 87. Each branch of this forked end 118 is in turn bifurcated as at 119 (Figs. 3 and 4) to embrace a stud 120 secured to the sleeve 87. The two studs 120 are aligned transversely of the sleeve 87 on either side of the stem 81 but are not connected at their inner ends with the result that the stem 81 and the bolt 82 may move freely with respect to the sleeve 87. The other arm of the bell-crank 93 is substantially vertical and terminates somewhat above the upper end of the housing 23. That terminal of the cable 92 extending beyond the pulley 111 is attached to the extremity of the vertical arm of the bell-crank 93, so that it may oscillate said bell-crank in the manner and for the purposes hereinafter set forth.

The operation of the present combined centering, damping and locking mechanism for aligning the tail wheel 25 in fore-and-aft position in coordination with the adjustment of the elevators is as follows:

In an initial position where the tail wheel 25 is protracted and the elevators are in neutral, with the components as are shown in Figs. 1, 3 and 4, the roller 91 is located under the track or section 103 of the cam 90 to act as a stop in preventing the spring 106 from exerting an operating pull on the cable 92 and the bolt 82 is located in its extreme retracted position by the spring 86 operating between the end wall 78 of the casing 75 and the sleeve 87. The length of the cable 92 is such that there is no appreciable slack therein when the parts are in these positions and the wheel 25 and its spindle 40—41—44—47 are free to caster or swivel in the bearings 48 and 42 in the housing 23.

When taxiing to a take-off with the tail wheel thus free to swivel and the elevators in neutral, the pilot always manipulates the stick or control to adjust the elevators in order to keep the tail of the ship down. The links 19, 20 and 21 and the roller 91 are thereby moved from the position of Fig. 1 into the position of Fig. 8. The lever 99 at this time is momentarily abandoned to the combined action of the springs 106 and 84 and swings clockwise about its pivot 100 while the roller 91 rides over the ramp 105 to the cam track 102. As the cam track 102 is then concentric to the pivot 19' of the idler 19 and its radial arm 95, no further relative angular movement of the lever 99 occurs when and as the roller 91 travels along this cam track 102. This swinging movement of the lever 99 is transmitted through the taut cable 92 to the bell-crank 93 to swing it simultaneously and slide the sleeve 87 downwardly against the action of the spring 86. The locking bolt 82 is thereby abandoned to the action of the spring 84 and its tapering point 85 is projected into the hole 73 if during taxiing the wheel 25 is aligned fore-and-aft, or rides on the ring 71, ready to enter said hole 73 as soon as alignment of the bolt 82 and hole 73 is established. As the pilot always straightens his course near the end of the taxiing run the locking bolt 82 will ultimately align with the hole 73 prior to actual take-off run. During this run to a take-off, the spring 62 acts constantly, on the one hand, through the self-centering cams 54 and 55 and cam-followers or rollers 60, to urge the wheel 25 back in its fore-and-aft aligned position and, on the other hand, through the damping device 65 and 67, to prevent or minimize any tendency of the wheel to oscillate or shimmy.

Thus, the tail wheel 25 is always locked in its fore-and-aft position immediately before and during the actual take-off run and take-off and remains positively locked in this position during the entire ensuing flight when the present invention and its components has no effect or influence on the movements or operations of the elevators due to the fact that the active surface 102—103—105 of the cam 90 remains out of the circular path of the roller 91 due to the movement of the idler 19 about the center 19' as long as the tail wheel is retracted into the fuselage 10. This disabling of the mechanical connection between the elevator control mechanism and the tail wheel locking mechanism is automatically effected upon retraction of the tail wheel by the action of the baffle 114 which deflects the cable 92 as shown in Fig. 2 to swing the bell-crank 93 about its pivot 117 and compress the spring 86. As this action does not permit further lowering of the sleeve 87 and further rotation of the bell-crank 93 about the pivot 117, this deflection of the cable 92 results in a downward pull which swings the lever 99 against the action of the spring 106 to an angle sufficient to raise the bottom of the ramp 105 and the cam 103 above the path of and out of contact with the roller 91.

When, prior to landing with the elevators down, the pilot lowers the tail wheel 25, the baffle 114 is withdrawn from under the cable 92 thereby abandoning it to the simultaneous action in opposite directions of the springs 106, 84 and of the spring 86. While the pull of the spring 86 then swings the bell-crank 93 in the reverse direction and withdraws the locking pin 85 from the hole 73, thereby unlocking the tail wheel 25, the pull due to the combined action of the springs 106 and 84 swings the lever 99 clockwise (Fig. 2) until the cam 90 contacts and rides on the roller 91. As long as the pilot keeps the elevators down and even if he varies their angular position of adjustment, the roller 91 rides over the track 103 without affecting the angular position of the lever 99, as the track 103 is then concentric to the pivot 19' of the idler 19. Though during this short period of descent with the landing gear down, the tail wheel is unlocked, it will not deviate from its position of fore-and-aft alignment due to the centering action of the spring 62.

When the pilot adjusts the elevators to level-off for a landing, the roller 91 returns in its neutral position, substantially in the vertical plane of the pivot 19', and all the parts of the swivel-lock mechanism are back in the initial unlocked position shown in Fig. 1. Just before, or as soon as the tail wheel 25 touches the ground, the pilot adjusts the elevators to keep the tail of the craft down, and by that action re-locks the tail wheel as has been described above and as shown partially in Figs. 7 and 8.

Thus the tail wheel 25 is always locked in its fore-and-aft aligned position during the actual landing operation and remains positively locked in this position as the elevators are used to keep the tail wheel on the ground. When speed has been reduced to the point where there is no danger of ground looping, the pilot may maintain the tail wheel in this locked position by leaving the elevators raised or may unlock it by returning the elevators in neutral, or re-lock it by again manipulating the control lever for the operation of the elevators, since, due to reduction of speed, the elevators are then aerodynamically ineffective.

It must be observed, that, due to this proximity of the ramp 105 of the cam 90 to the neutral position of the roller 91 (Fig. 1), a relatively small angular displacement of the control lever from neutral (of the order of a few degrees) will suffice to effect this locking of the tail wheel 25 upon adjusting the elevators through a corresponding relatively small angle. Further adjustment of the elevators has no effect on the tail wheel locking mechanism, as the roller 91 merely rides over track 102 without resulting in any relative angular movement of the lever 99.

Inversely, when the pilot returns the control lever to neutral, nothing happens to the tail wheel locking mechanism as long as the roller 91 merely rides over and on track 102, but a few degrees before reaching its neutral position, the roller 91 rides on the ramp 105 to move the lever 99 against the action of the spring 106 and thereby allows the unlocking of the tail wheel to take place under the action of the spring 86.

While the present invention has been shown and described in detail as applied to a tail wheel or skid of an aircraft, it is to be understood that it can as well be adapted to the castering or swivelling nose wheel of a tricycle landing-gear.

What is claimed is:

1. The combination with an aircraft having a manual control system to adjust the elevators thereof, of a swivelled auxiliary landing gear, a mechanism to retract and protract said landing gear, latching mechanism positively locking said gear against swivelling, a mechanical connection between the control system and said latching mechanism for coordinating the operation thereof with the operation of the elevator control system during landing and take-off, and means, responsive to the operation of the retracting mechanism, to render said mechanical connection inoperative during flight.

2. In an aircraft, the combination with an elevator control system, of a retractable auxiliary landing gear comprising a yoke mounted on a fixed pivot on the aircraft, a housing rigid with said yoke, a spindle and knuckle mounted to swivel in said housing, and an auxiliary wheel mounted on said knuckle, a mechanism coacting with said yoke to retract and protract said wheel, a latch positively locking said spindle against swivelling movement in said housing and thereby secure said wheel in fore-and-aft alignment, means interposed between said elevator control system and said latch to render the latch effective upon the adjustment of said system to set the elevators for take-off or landing, and means, responsive to the operation of said retracting and protracting mechanism, for rendering the last said means ineffective during flight.

3. In an aircraft, the combination with an elevator control system, of a retractable auxiliary landing gear comprising a yoke mounted on a fixed pivot on the aircraft, a housing rigid with said yoke, a spindle and knuckle mounted to swivel in said housing, and an auxiliary wheel mounted on said knuckle, a mechanism coacting with said yoke to retract and protract said wheel, a latch positively locking said spindle against swivelling movement in said housing and thereby secure said wheel in fore-and-aft alignment, means interposed between said elevator control system and said latch to render the latch effective upon the adjustment of said system to set the elevators for take-off or landing, and means, responsive to the operation of said retracting and protracting mechanism, for rendering the last said means ineffective upon the retraction of said landing gear during flight and to restore its effectiveness upon the protraction of said landing gear for landing.

4. The combination with an aircraft having a swivelled auxiliary landing gear and means for adjusting the elevators thereof, of a housing, a splined spindle carrying the auxiliary landing gear journaled in said housing, a centering bearing means slidably splined to said spindle adjacent one of its ends, an annular brake member fixed to that end of said housing remote from said bearing means, a slidably complemental brake member splined to said spindle, a spring situated in said housing and interposed between said slidable bearing means and said slidable complemental brake member and thereby urge the auxiliary gear to fore-and-aft alignment and simultaneously reduce shimmies or oscillations thereof, a locking mechanism for positively fixing the spindle against swivelling movement in said housing and thereby lock the gear in fixed fore-and-aft alignment, and means associated with the means for adjusting the elevators and arranged to render said locking mechanism effective upon the adjustment of said elevators for landing or take-off.

5. In an aircraft, the combination with a swivelled auxiliary landing gear, of a housing carried by the aircraft, a splined spindle supporting said gear journaled in said housing, a plate having internal cam surfaces surrounding said spindle and secured against movement to one end of the housing, a splined sleeve slidable on the spline of the spindle adjacent the plate aforesaid and having bearing members coacting with the cam surfaces of said plate, a stationary brake member attached to the inner face of the housing at the end thereof remote from said plate, a complemental brake member splined to and slidable on the spline of the spindle, and a spring interposed between said sleeve and said complemental brake member to urge and maintain the bearing members of the former in operating contact with said cam surfaces and the complemental brake member in operating engagement with said stationary brake member.

6. The combination with an aircraft having a control system to adjust its movable control surfaces, a swivelled ground engaging member and a mechanism to retract said member, of a locking mechanism to positively and automatically secure the auxiliary ground engaging member in fore-and-aft alignment and against swivelling movement, a connection for rendering said locking mechanism effective upon the operation of the control system to adjust the movable control surfaces for take-off and landing, and means automatically responsive to the operation of the retracting mechanism to render said connection inoperative during flight.

7. The combination with an aircraft having a push-pull rod system to adjust its elevators, a tail wheel mounted to caster, and a mechanism to retract and protract said tail wheel, of a locking mechanism to secure said tail wheel in fore-and-aft alignment, a mechanical connection interposed between said locking mechanism and the push-pull rod system to adjust and render said locking mechanism effective upon the adjustment of the system to set the elevators for take-off or landing, and means, responsive to the operation of the retracting and protracting mechanism, to render said mechanical connection inoperative upon retraction of the tail wheel.

8. The combination with an aircraft having a rigid push-pull rod system including a pivotally mounted idler for the adjustment of its elevators and a swivelling tail wheel, of a roller carried by said idler of the push-pull rod system, a lever pivotally mounted on the aircraft structure to be swung toward and away from said roller, a two-stage cam on one end arm of said lever whereby either stage of said cam may be situated concentric to the pivot of said idler to cooperate with said roller, a spring constantly urging said cam into engagement with said roller, a spring actuated bolt coacting with said tail wheel for positively and automatically locking it in fore-and-aft alignment, and a cable connection between said bolt and the end of said lever opposed to that carrying said cam by which the oscillations of the lever by the movement of said roller relatively to the cam determines the effectiveness and ineffectiveness of the spring actuating said bolt.

9. The combination with an aircraft having means for controlling its elevators, of a tail wheel swivelled in a yoke mounted for pivotal movement in a vertical plane, a mechanism to retract and protract said tail wheel, a spring bolt to lock the tail wheel against swivelling movement relatively to said yoke, an antagonistic spring normally keeping said bolt in inactive position, compression means for disabling said antagonistic spring, a lever responsive to the movements of the elevator controlling means, a cable connection between said compression means and said lever, tensioning means to keep said cable connection constantly taut, and deflecting means carried by the yoke to swing said lever out of engagement by the elevator controlling means upon retraction of the tail wheel.

10. In an aircraft, the combination with the push-pull rod system for the adjustment of the elevators of the aircraft, of an idler interposed between and connected to components of said system, a fixed structural element, spaced arms rigid with said element and extending laterally therefrom, a hub pivotally mounted between the extremities of said arms having the idler of the push-pull rod system fixed to and suspended from one of its ends, a radial arm secured to the other end of said hub and terminating adjacent said idler, a roller journaled adjacent said arm on an axis normal to the radial arm and to the idler medial of its length and arranged to swing with said idler as it moves during the adjustment of the push-pull rod system to regulate the elevators, a vertical bracket plate secured to said structural element at right angles to the spaced arms aforesaid, a lever pivoted centrally of its length to said bracket, a two stage cam fixed to one end of said lever and located above said roller, the stages of said cam being connected by a ramp, a spring interposed between the opposite end of said lever to constantly urge said cam toward said roller, a retractable tail wheel provided with a castered mounting, a spring actuated lock to secure said tail wheel against castering, a cable connected to that end of the lever opposed to said cam and leading to said lock, and means associated with said lock and under the control of said cable to oppose the spring actuation of the lock and to abandon the lock to its spring actuation upon the operation of the push-pull rod system to adjust the elevators and simultaneously oscillate said lever through the medium of the coaction between the cam and roller as aforesaid.

11. In an aircraft, the combination with the push-pull rod system for the adjustment of the elevators of the aircraft, of an idler interposed between and connected to components of said system, a fixed structural element, spaced arms rigid with said element and extending laterally therefrom, a hub pivotally mounted between the extremities of said arms having the idler of the push-pull rod system fixed to and suspended from one of its ends, a radial arm secured to the other end of said hub and terminating adjacent said idler, a roller journaled adjacent said arm on an axis normal to the radial arm and to the idler medial of its length and arranged to swing with said idler as it moves during the adjustment of the push-pull rod system to regulate the elevators, a vertical bracket plate secured to said structural element at right angles to the spaced arms aforesaid, a lever pivoted centrally of its length to said bracket, a two stage cam fixed to one end of said lever and located above said roller, the stages of said cam being connected by a ramp, a spring interposed between the opposite end of said lever to constantly urge said cam toward said roller, a yoke pivoted to the aircraft, a housing fixed to the yoke, a tail wheel, a spindle carrying said tail-wheel mounted to caster in said housing, a bolt casing fixed to said housing, a bolt mounted to reciprocate in said casing for projection into locking engagement with said spindle, oppositely acting springs cooperating with said bolt, one to project the bolt and the other to retract it against the action of the projecting spring, and connection between that end of the aforesaid lever opposed to said cam to render said retracting spring ineffective upon the oscillation of the lever by means of the coaction between the cam and roller upon the operation of the push-pull rod system.

12. In an aircraft, the combination with the push-pull rod system for the adjustment of the elevators of the aircraft, of an idler interposed between and connected to components of said system, a fixed structural element, spaced arms rigid with said element and extending laterally therefrom, a hub pivotally mounted between the extremities of said arms having the idler of the push-pull rod system fixed to and suspended from one of its ends, a radial arm secured to the other end of said hub and terminating adjacent said idler, a roller journaled adjacent said arm on an axial normal to the radial arm and to the idler medial of its length and arranged to swing with said idler as it moves during the adjustment of the push-pull rod system to regulate the elevators, a vertical bracket plate secured to said structural element at right angles to the spaced arms aforesaid, a lever pivoted centrally of its length to said bracket, a two stage cam fixed to one end of said lever and located above said roller, the stages of said cam being connected by a ramp, a spring interposed between the opposite end of said lever to constantly urge said cam toward said roller, a yoke pivoted to the aircraft, a housing fixed to the yoke, a tail wheel, a spindle carrying said tail-wheel mounted to caster in said housing, a bolt casing fixed to said housing, a bolt mounted to reciprocate in said casing for projection into locking engagement with said spindle, oppositely acting springs cooperating with said bolt, one to project the bolt and the other to retract it against the action of the projecting spring, a cable attached to that end of the lever opposed to said cam and extending to said bolt, and a connection between said cable and said retracting spring whereby upon the operation of the lever by the coaction between the roller and cam aforesaid as the push-pull rod system is adjusted, the said retracting spring becomes disconnected from said bolt to abandon it solely to the action of the projecting spring.

13. In an aircraft, the combination with the push-pull rod system for the adjustment of the elevators of the aircraft, of an idler interposed between and connected to components of said system, a fixed structural element, spaced arms rigid with said element and extending laterally therefrom, a hub pivotally mounted between the extremities of said arms having the idler of the push-pull rod system fixed to and suspended from one of its ends, a radial arm secured to the other end of said hub and terminating adjacent said idler, a roller journaled adjacent said arm on an axis normal to the radial arm and to the idler medial of its length and arranged to swing with said idler as it moves during the adjustment of the push-pull rod system to regulate the elevators, a vertical bracket plate secured to said structural element at right angles to the spaced arms aforesaid, a lever pivoted centrally of its length to said bracket, a two stage cam fixed to one end of said lever and located above said roller, the stages of said cam being connected by a ramp, a spring interposed between the opposite end of said lever to constantly urge said cam toward said roller, a yoke pivoted to the aircraft, a housing fixed to the yoke, a tail wheel, a spindle carrying said tail-wheel mounted to caster in said housing, a bolt casing fixed to said housing, a bolt mounted to reciprocate in said casing for projection into locking engagement with said spindle, oppositely acting springs cooperating with said bolt, one to project the bolt and the other to retract it against the action of the projecting spring, a cable attached to that end of the lever opposed to said cam and extending to said bolt, a sleeve slidably mounted on said bolt to abut the retracting spring and through which said retracting spring acts on the bolt, and a bell crank pivoted on said housing having one arm connected to said sleeve and the other connected to said cable so arranged that when the roller operates against one stage of the cam the lever aforesaid may be oscillated to swing the bell crank about its pivot and thereby functionally disconnect the sleeve from the bolt.

14. In an aircraft, the combination with the push-pull rod system for the adjustment of the elevators of the aircraft, of an idler interposed between and connected to components of said system, a fixed structural element, spaced arms rigid with said element and extending laterally therefrom, a hub pivotally mounted between the extremities of said arms having the idler of the push-pull rod system fixed to and suspended from one of its ends, a radial arm secured to the other end of said hub and terminating adjacent said idler, a roller journaled adjacent said arm on an axis normal to the radial arm and to the idler medial of its length and arranged to swing with said idler as it moves during the adjustment of the push-pull rod system to regulate the elevators, a vertical bracket plate secured to said structural element at right angles to the spaced arms aforesaid, a lever pivoted centrally of its length to said bracket, a two stage cam fixed to one end of said lever and located above said roller, the stages of said cam being connected by a ramp, a spring interposed between the opposite end of said lever to constantly urge said cam toward said roller, a yoke pivoted to the aircraft, a housing fixed to the yoke, a tail wheel, a spindle carrying said tail-wheel mounted to caster in said housing, a bolt casing fixed to said housing, a bolt mounted to reciprocate in said casing for projection into locking engagement with said spindle, oppositely acting springs cooperating with said bolt, one to project the bolt and the other to retract it against the action of the projecting spring, a cable attached to that end of the lever opposed to said cam and extending to said bolt, a sleeve slidably mounted on said bolt to abut the retracting spring on one of its sides and to abut a projection fixed to the bolt on the other of its sides thereby subjecting the bolt to the action of the retracting spring upon contact between the sleeve and projection, a bell crank pivoted to the housing having one arm connected to the sleeve and its other arm connected to the cable whereby the oscillation of the bell crank by and through the cable moves the sleeve out of engagement with said projection, and means carried by the housing to engage the cable upon the retracting movement of the yoke and thereby swing the lever against the action of its spring and remove the cam from operative contact with the roller.

15. The combination with an aircraft having a fuselage, a rigid push-pull rod system to control its elevators, and a swivelled tail wheel of a substantially horizontal structure fixed across the aft portion of the fuselage, an idler incorporated in the push-pull rod system at its lower end and having its upper end pivotally suspended on said structure, a roller carried on one side of said idler, a lever mounted on said structure for pivotal movement in the plane of motion of said roller, a cam fastened to one arm of said lever to cooperate with said roller, a spring anchored to said structure and connected to the end of the said lever opposed to said cam, a locking mechanism to secure the tail wheel in fixed fore-and-aft alignment, upon the movement of the push-pull rod system to adjust the elevators, and an operative connection between said mechanism and the upper arm of said lever.

16. The combination with an aircraft having a system for the adjustment of its movable control surfaces, a swivelled ground engaging member, and a retracting mechanism for said member, of a normally inoperative locking mechanism associated with said ground engaging member which when operative secures it against swivelling movement, means operable by and from the system aforesaid to render said locking mechanism operative upon the adjustment of the movable control surfaces, and means effective in response to the operation of said retracting mechanism to render said locking mechanism operative independently of the system for adjustment of the control surfaces.

17. The combination with an aircraft having a system for the adjustment of its movable control surfaces, a swivelled ground engaging member including means to automatically center it in fore and aft alignment, and a retracting mechanism for said member, of a normally inoperative locking mechanism associated with said ground engaging member to secure it against swivelling movement when centered in fore and aft alignment, means responsive to the aforesaid system for establishing the operation of said locking mechanism upon an adjustment of the control surfaces, and means operable in response to the operation of the aforesaid retracting mechanism to establish the operation of said locking mechanism independently of said system.

18. In an aircraft including movable control surfaces and a linkage system for the adjustment thereof, the combination with an auxiliary landing gear mounted on the aircraft for swivelling movement relative thereto, of a locking mechanism engaging and holding said auxiliary landing gear against swivelling movement, arresting means preventing the engaging and holding operation of said locking mechanism, and means under the control of said linkage system to release said locking mechanism from the action of said arresting means.

19. In an aircraft including movable control surfaces and a linkage system for the adjustment thereof, the combination with a housing, an auxiliary landing gear mounted to swivel in said housing, of a locking mechanism to secure said landing gear against movement in its housing, means holding said locking mechanism normally in an inoperative position, and means interposed between the locking mechanism and the linkage system aforesaid to release said locking mechanism and thereby secure the landing gear against movement relative to its housing upon the adjustment of the linkage system to regulate the movable control surfaces.

20. In an aircraft, the combination with a linkage system for the adjustment of a control surface thereof, of a swivelled auxiliary landing gear, a controllable locking means securing said auxiliary landing gear against swivelling, restraining means rendering said locking means inoperative, and a control for said restraining means interposed between said linkage system and said restraining means, whereby said locking means becomes operative and the auxiliary gear locked against swivelling upon the operation of the linkage system in one direction.

EDWARD W. SHAW.

REFERENCES CITED

The following references are of record in the file of this patent:

UNITED STATES PATENTS

| Number | Name | Date |
|---|---|---|
| Re. 22,674 | Noonan | Sept. 18, 1945 |
| 2,192,282 | Warner | Mar. 5, 1940 |
| 2,333,550 | Parker | Nov. 2, 1943 |
| 2,379,173 | Miller | June 26, 1945 |
| 2,385,891 | Swanson | Oct. 2, 1945 |
| 2,454,658 | Leitch | Nov. 23, 1948 |

FOREIGN PATENTS

| Number | Country | Date |
|---|---|---|
| 700,660 | Germany | Dec. 27, 1940 |